Nov. 17, 1964     A. A. LORENZ     3,157,757
DUAL MASS ACCELERATION SENSITIVE SWITCHING MECHANISM
Filed Sept. 27, 1962
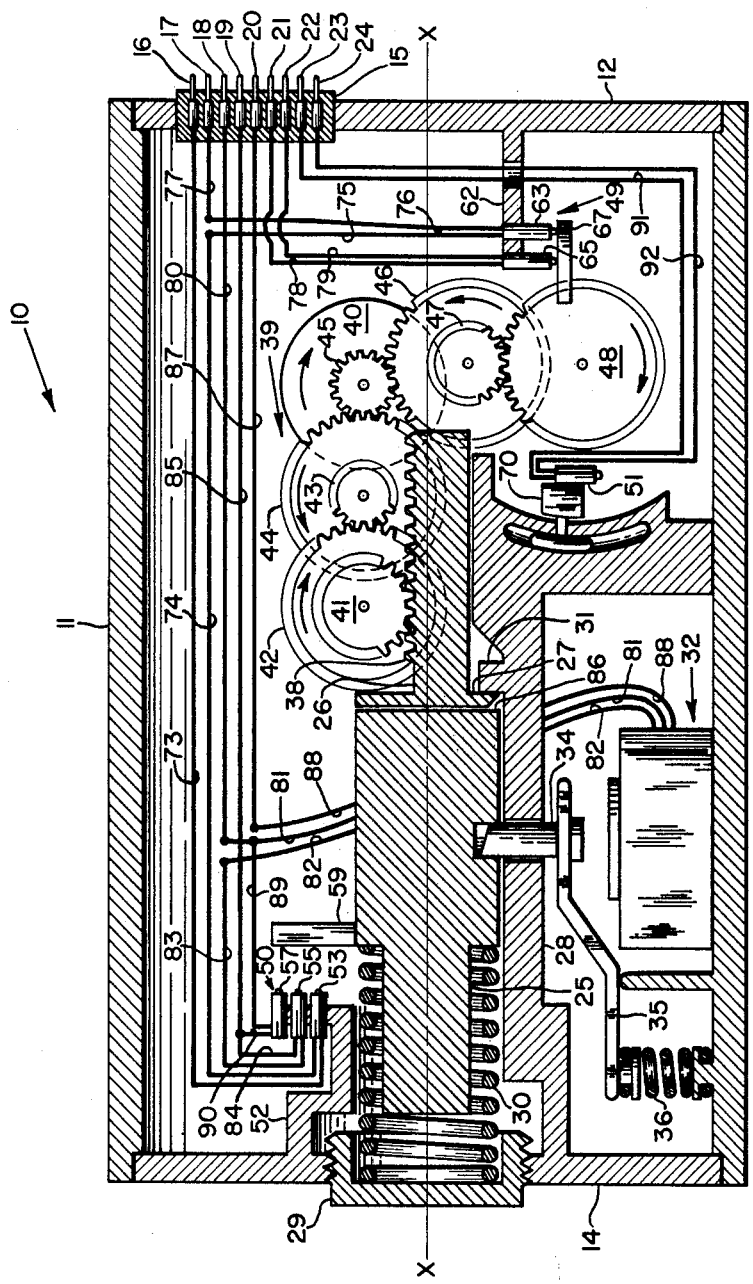
INVENTOR
ALAN A. LORENZ
BY
*Roger W. Nolan*
ATTORNEY

United States Patent Office 3,157,757
Patented Nov. 17, 1964

3,157,757
DUAL MASS ACCELERATION SENSITIVE
SWITCHING MECHANISM
Alan A. Lorenz, Davenport, Iowa, assignor to The Bendix
Corporation, Davenport, Iowa, a corporation of
Delaware
Filed Sept. 27, 1962, Ser. No. 226,602
9 Claims. (Cl. 200—61.45)

This invention relates to an acceleration sensitive device and more particularly to a mechanical double integrating accelerometer utilizing two inertia responsive masses and having as one of its functions the activation of a switch after a predetermined value of distance has been reached.

Acceleration responsive instruments have been used to provide values of air vehicle acceleration, velocity and distance. The present invention relates to a device capable of providing all three functions but is primarily designed to provide an improved mechanism for detecting vehicle distance. Within the purview of the invention the other functions of acceleration and velocity are provided or may be provided with minor modifications of the detection equipment.

The present invention has as one of its objects the provision of an improved acceleration sensitive mechanism capable of detecting values of acceleration, velocity and distance of an air vehicle.

In aircraft designed for launching missiles, it is necessary to arm the missile after the missile has traveled a safe distance from the aircraft. Present apparatus designed to provide the arming function include acceleration sensitive devices which include integrating mechanisms to transform the acceleration history into a distance from the launch measurement. Electronic integrators have been used but have been found to be adversely affected by radiation, in addition they are complex, bulky and costly. Other mechanisms having integration properties, including gyroscopes, tuning forks and mechanical analog computers having wheel-and-disk integrators, involve mechanization problems which make them impractical for missile application.

The principles are also known for an integrator, which is an analog device, in which the acceleration of a mass is directly proportional to the acceleration of the missile. This apparatus provides the properties that the velocity of the mass and the distance traveled by the mass are directly proportional to the velocity of the missile and the distance traveled by the missile, respectively. Known mechanical integrators based on the above principles have included an inertia responsive mass directly coupled to an integrating flywheel. Mechanization of this type of integrator has not proven satisfactory for missile application because of friction, lack of fail-safe features, and inability to pick-off the distance and velocity functions.

Another object of the present invention is to provide an improved mechanical double integrating accelerometer wherein the acceleration, velocity and displacement of the seismic mass are directly proportional to the acceleration, velocity and displacement of the vehicle on which it is mounted.

A further object of the present invention is to provide a dual mass inertia responsive device having one of said masses providing a switch closure after a predetermined value of acceleration and a second of said masses providing a switch closure after a predetermined displacement and said combination of masses providing an indication of a predetermined value of acceleration being maintained for a period of time.

A still further object of the present invention is to provide a duel mass acceleration sensitive mechanism utilizing a flywheel type double integrator wherein the displacement indication can be made from the moving launch vehicle or from a fixed point in space.

A still further object of the present invention is to provide a duel mass mechanical double integrating acceleration sensitive mechanism wherein premature indication of vehicle displacement is prevented.

A still further object of the present invention is to provide a duel mass acceleration sensitive mechanism which is capable of measuring vehicle velocity.

A still further object of the present invention is to provide a dual mass mechanical double integrating acceleration sensitive mechanism wherein both positive and negative values of acceleration are measured whereby in missile applications both the positive acceleration values imparted by the booster engines and negative acceleration values caused by air drag are measured.

A still further object of the present invention is to provide a dual mass mechanical double integrating acceleration sensitive mechanism which is small, light weight, and inexpensive.

Certain of these objects are realized in the invention by the provision of a bias mass and a seismic mass responsive to acceleration forces along a sensitive axis, flywheel means for mechanical double integration of the acceleration forces with respect to time and means for indicating displacement resulting from the acceleration forces.

The foregoing and other objects and advantages of the invention will appear more fully hereinafter from a consideration of the detailed description which follows; taken together with the accompanying drawing wherein an embodiment of the invention is illustrated. It is to be expressly understood, however, that the drawing is for the purpose of illustration and description and is not to be construed as defining the limits of the invention.

The single figure of the drawing is a schematic diagram of one embodiment of the invention.

Referring now to the drawing, there is shown an illustrative embodiment of the present invention wherein the numeral 10 designates a separation distance switch including a housing 11 having end closures 12 and 14. The accelerometer mechanism is responsive to positive acceleration forces along the sensitive axis (line X—X) in the direction of end 12 from end 14.

Electrical connector 15 is disposed through end closure 12 and includes terminal pins 16, 17, 18, 19, 20, 21, 22, 23, and 24 for connection to a mating connector of the utilization device, for example, the arming circuit of a missile.

Separation distance switch 10 includes a pair of inertia responsive masses, bias mass 25 and seismic mass 26, axially aligned within the housing 11 along the sensitive axis X—X. Bias mass 25 is supported by means of mass support member 28 and seismic mass 26 is supported on miniature radial ball bearing (not shown) of conventional design, which bearings are mounted on mass support member 28. Advantageously, friction is substantially eliminated by mounting mass 26 as described above.

Adjustable end cap 29 is mounted through end closure 14 and disposed for axial movement relative thereto. Bias mass compression spring 30 is centered on bias 25 and centered in end cap 29, and held in compression by means of stop 31 mounted on support member 28. Axial movement of the end cap 29 in the end closures 14 provides an adjustment for the initial preload spring force of compression spring 30 and thus determines the inertia force upon which bias mass 25 will begin to move along the sensitive axis X—X.

The invention advantageously employs a mechanism for locking and releasing the bias mass 25 and seismic mass 26 into various positions along the sensitive axis X—X.

In the embodiment illustrated, the mechanism includes solenoid 32 having a plunger 34 maintained in a locking position by means of lever 35 and tension spring 36. Bias mass 25 is maintained in a locked position by means of plunger 34 of solenoid 32.

Seismic mass 26 is axially aligned within housing 11 and is maintained in a biased position against bias mass 25 by means of compression spring 30 when mass 25 is locked into the position shown by solenoid 32. Gear rack 38 is made a part of seismic mass 26 and is disposed for movement in the direction of sensitive axis X—X.

The invention advantageously employs a flywheel type double integrator mechanism comprising seismic mass 26, gear train 39 and flywheel 40. The input acceleration as detected by mass 26 is mechanically integrated twice with respect to time providing an output displacement proportional to vehicle displacement. Gear train 39 includes pinion gear 41, which meshes with gear rack 38 of seismic mass 26, spur gear 42, pinion gear 43, spur gear 44, pinion gear 45, spur gear 46, pinion gear 47, and switch disk gear 48. Pinion gear 41 and spur gear 42 are mounted on a common shaft, pinion gear 43 and spur gear 44 are mounted on a common shaft, pinion gear 45 and flywheel 40 are mounted on a common shaft and spur gear 46 and pinion gear 47 are mounted on a common shaft. Advantageously the gear train may be designed to provide identical rotation of spur gear 42 and switch disk gear 48. For the purposes of clearly illustrating which gears mesh with each other, the gear teeth are shown on only a portion of the gears. The direction of rotation of the gears in response to the movement of seismic mass 26 is in the direction indicated by the arrows. To provide perfect integration, the gears of gear train 39 and flywheel 40 are perfectly balanced and the shafts of the gear train 39 and flywheel 40 are mounted on ball pivot bearings.

Flywheel 40 is the mass restraint for seismic mass 26 and provides inertia for the system. Gear train 39 gears up to flywheel 40 and then gears down from the flywheel 40 and, as noted above, the rotation of gears 42 and 48 is identical and less than one revolution in the embodiment illustrated. Gears 42 and 44 increase the effective inertia of the flywheel to the integrating mass. Advantageously, the system disclosed prevents premature actuation in the case of a malfunction in the integrating mechanism by inclusion of gears 46 and 47 beyond flywheel 40.

The accelerometer system as heretofore illustrated may advantageously include a velocity detecting mechanism (not shown) whereby the value for the first integral of acceleration is obtained. The velocity of any gear of the gear train 39 or flywheel 40 is directly proportional to the velocity of the vehicle in which switch 10 is mounted, therefore any of a wide variety of velocity pick-off mechanisms may be used.

Electrically the mechanism includes first motion switch set 50, inertia switch set 49 and distance switch 51. First motion switch set 50 is linearly actuated switch while the inertia switch set 49 and distance switch 51 are rotary actuated.

First motion switch set 50 includes support member 52 having normally closed monitor switch 53, normally closed solenoid unlatch switch 55 and normally open solenoids reset switch 57 mounted thereon. Switch 50 includes actuator 59 mounted on bias mass 25 and disposed for axial movement for activation of switches 53, 55, and 57 whereby switches 53 and 55 are opened and switch 57 is closed.

Inertia switch set 49 includes support member 62 mounted on end closure 12 having normally closed monitor switch 63 and normally open inertia switch 65 mounted thereon. Switch set 49 includes actuator 67 mounted on switch disk gear 48 and disposed for rotary movement away from switch set 49 whereby upon initial motion switch 63 is opened and switch 65 is closed.

Distance switch 51 is mounted on movable member 70 disposed for adjustment along support member 28. Distance switch 51 is normally open and is closed by means of actuator 67.

Electrically, the invention includes five circuits: monitor circuit, inertia switch circuit, solenoid unlatch circuit, solenoid reset circuit, and distance switch circuit.

The monitor circuit, by means of an electrical signal across pins 16 and 17, indicates that the mechanism is in a preset position ready for operation. The monitor circuit defines a completed circuit having in series normally closed monitor switch 63 and normally closed monitor switch 53. Monitor circuit includes pin 16, wire 73, switch 53, wire 74, wire 75, switch 63, wire 76, wire 77, and pin 17.

The inertia switch circuit, by means of an electrical signal across terminal pin 21 and 22, indicates the first movement of the integrating mechanism. Actuation is a result of the movement of actuator 67 away from normally open inertia switch 65. Inertia switch circuit includes pin 21, wire 78, switch 65, wire 79, and pin 22.

Solenoid unlatch circuit is completed upon the launching of the missile. A voltage is applied across terminal pins 18 and 19 thereby actuating solenoid 32 which moves plunger 34 from its initial position. Bias mass 25 is now free to move in accordance with inertia forces. Solenoid unlatch circuit includes pin 18, wire 80, wire 81, wire 82, wire 83, switch 55, wire 84, wire 85, and pin 19. Upon completion of the strokes of bias mass 25 actuator 59 engages solenoid unlatch switch 55 and opens the normally closed switch 55. Solenoid unlatch circuit is thus broken and plunger 34 is free to lock bias mass 25 into position which is accomplished by plunger 34 sliding against surface 86 of bias mass 25.

The solenoid reset circuit is completed upon the movement of actuator 59 against normally open solenoid reset switch 57. Thus an applied voltage across terminal pins 19 and 20 will move plunger 34 from its position of locking bias mass 25 and seismic mass 26. The solenoid reset circuit includes pin 20, wire 87, wire 88, wire 81, wire 89, switch 57, wire 90, wire 85, and terminal pin 19.

The distance switch circuit is completed upon the rotation of actuator 67 to a position whereby it engages normally open distance switch 51. A signal is thus given across terminal pins 23 and 24 which indicates that a predetermined value of displacement has been reached. The distance switch circuit includes pin 23, wire 91, switch 51, wire 92, and pin 24.

The parameters of the invention will be more fully understood by the following operational description of the invention which includes values of inertia forces, distance and time, these values should not be taken as an expression of the limits of the invention but are for the purpose of more clearly illustrating a specific application of the invention. For the purpose of illustration, a bias level of 3.0 $g$ (3.0 times the force of gravity), a time delay of 0.2 second and a separation value of 9,000 feet will be used.

The invention may be advantageously used to provide a variety of the function required in the firing of a missile. One of such required functions is to actuate the missile arming circuit after the missile has traveled a safe distance from the air vehicle. When thus used as a separation distance switch bias mass 25 is constrained by spring 30 and locked into position by means of plunger 34 of solenoid 32.

Bias mass 25 determined the bias level (3.0 $g$) at which integration begins. Utilization of bias mass 25 as heretofore described prevents premature or inadvertent integration due to the earth's gravity. Advantageously, bias mass 25 also functions as an inertia switch. In missile applications, bias mass 25 prevents arming of the missile in case of motor failure and insures proper booster build-up from thrust before arming.

On firing the missile from the air vehicle a voltage is applied across pins 18 and 19 and the solenoid 32 is actuated through the solenoid unlatch circuit thereby unlocking bias mass 25. After release by solenoid 32 and an application of acceleration greater than the bias level of 3.0 g along the X—X axis in the direction of end 12 from end 14, the bias mass 25 moves to the end of its stroke. The movement of bias mass 25 is instantaneous since there is no damping of the mass 25 and movement is restrained only by compression spring 30. When bias mass 25 has completed its strokes, first motion switch set 50 functions and actuator 59 moves against switches 53, 55, and 57. The solenoid unlatch circuit is thereby broken and plunger 34 is forced into a locked position by means of spring 36 and thus locks bias mass 25 into position by means of plunger 34 resting against surface 86 of mass 25. The monitor circuit is also broken and thereby an electrical signal is given indicating that an acceleration level of 3.0 g has been reached, such signal is obtained across terminal pins 16 and 17.

Advantageously the system includes a solenoid reset circuit which has been completed by means of actuator 59 closing the normally open solenoid reset switch 57. Application of a voltage across terminal pins 19 and 20 will move plunger 34 from its locked position and bias mass 25 will return to its initial position by means of spring 30.

With the bias mass 25 at its final position, the seismic mass 26 is restrained only by the gear train 39 and flywheel 40. With a finite motion of the seismic mass 26, gear train 39 and flywheel 40, the inertia switch 49 functions. Inertia switch circuit is completed by means of the movement of actuator 67 away from normally open inertia switch 65. Thus first motion of the integrating mechanism is indicated by means of an electrical signal received across terminal pins 21 and 22.

An indication that a minimum value acceleration has been reached for a period of time may be obtained. This indication is a result of the time lag between the completion of the stroke of bias mass 25 and the first motion gear 48. In the present illustration an acceleration level of 3.0 g is represented by an electrical signal across terminal pins 16 and 17 and may be taken as representing zero time, at a time delay of 0.2 second a second signal appears across terminal pins 21 and 22.

After the missile has gained the prescribed separation distance, 9,000 feet, the seismic mass 26, flywheel 40, and gear train 39 have completed their movement the distance switch 51 functions by means of actuator 67 moving against switch 51 and thereby closing the normally open switch. The seismic mass 26 and thus distance switch 51 are locked into position by solenoid 32 by means of plunger 34 resting against surface 27 of seismic mass 26. Thus the solenoid 32 locks in the completed distance circuit which is indicated by an electric signal across terminal pins 23 and 24. In the present illustration, terminal pins 23 and 24 are connected directly to the arming circuit of the missile whereby the arming operation begins upon completion of the switching circuit.

Advantageously, premature operation of the distance switch 51 is prevented since the flywheel must turn the proper number of revolutions before switching can occur. Rotation of end cap 29 will change the bias level of the inertia switch set 49. An adjustment for varying the separation distance value is provided by movement of switch 51 along the rack of support member 28. The invention as above illustrated provides a switch closure after the missile has traveled a safe distance from the launching air vehicle. Within the purview of the invention, switch 51 may be moved along support member 28 by a mechanism (not shown) in accordance with the velocity of the air vehicle providing closure of switch 51 at a distance equal to the distance from the launch position.

While the acceleration sensitive mechanism as shown in the drawing is of the construction shown and described, it is understood that the instant invention is not limited to any particular form of construction. Moreover, other changes and modifications of the novel acceleration sensitive mechanism contemplated herein may be made by those skilled in the art without departing from the scope of the instant invention.

I claim:

1. An acceleration responsive mechanism for producing signals which are a function of acceleration incident to forces acting in a direction of a sensitive axis through said mechanism including a signal proportional to the double integral of the acceleration it detects comprising, a bias mass responsive to acceleration forces along said sensitive axis of said mechanism, a seismic mass responsive to acceleration force along said sensitive axis of said mechanism and movable toward a switching position, means for restraining the relative movement of said seismic mass to said bias mass comprising gear and flywheel means disposed for rotational motion with the axial movement of said seismic mass for mechanical double integration of said acceleration force with respect to time, means disposed for activation when said seismic mass has moved along the sensitive axis to said switching position.

2. A dual mass acceleration responsive mechanism for producing signals which are a function of acceleration incident to forces acting in a direction of a sensitive axis through said mechanism including a signal proportional to the double integral of the acceleration it detects comprising, a bias mass responsive to acceleration forces along said sensitive axis of said mechanism toward a switching position, spring means having a predetermined restraining force for biasing said bias mass toward a reference position, a seismic mass responsive to acceleration forces along said sensitive axis of said mechanism and movable toward switching position, said seismic mass being maintained at said reference positions by said bias mass, means for restraining the relative movement of said seismic mass and said bias mass comprising gear and flywheel means disposed for rotational motion with the axial movement of said seismic mass for double integration of said acceleration force with respect to time, means disposed for activation when said seismic mass has moved along said sensitive axis to said switching position.

3. A double integrating accelerometer mechanism for producing signals which are a function of acceleration incident to forces acting in a direction of a sensitive axis through said mechanism comprising in combination, a first accelerometer system comprising a bias mass, and a spring, said bias mass responsive to acceleration forces along said sensitive axis of said accelerometer above a predetermined bias level, a second accelerometer system comprising a seismic mass, a gear train and flywheel, said seismic mass released for movement along said sensitive axis by said bias mass and restrained for movement by means of said gear train and said flywheel, said gear train and said flywheel disposed for double integration of said acceleration force with respect to time, means disposed for activation when said seismic mass has moved along said sensitive axis to a predetermined position.

4. A double integrating accelerometer mechanism for producing signals which are a function of acceleration incident to forces acting in a direction of a sensitive axis through said mechanism comprising in combination, a bias mass, seismic mass, integrating means, first motion switch, inertia switch, and a distance switch, said bias mass and said seismic mass disposed for movement along said sensitive axis of said accelerometer above a predetermined value of acceleration, said bias mass elastically restrained and said seismic mass mechanically restrained by said integrating means and arranged for motion in differing degrees, means for activating said first motion switch upon the completion of the stroke of said bias mass, means for activating said inertia switch upon the initial motion of said seismic mass, means for actuating said distance switch upon the completion of the stroke of said seismic mass.

5. A dual mass acceleration responsive mechanism for producing signals which are a function of acceleration incident to forces acting in a direction of a sensitive axis through said mechanism including a signal proportional to the double integral of the acceleration it detects comprising, a bias mass responsive to acceleration forces along said sensitive axis of said mechanism toward a switching position, spring means having a predetermined restraining force for biasing said bias mass toward a reference position, a seismic mass responsive to acceleration forces along said sensitive axis of said mechanism and movable toward a switching position, said seismic mass maintained at said reference position by said bias mass, double integrating means for restraining the relative movement of said seismic mass to said bias mass comprising a gear train having a gear thereof engaging said seismic mass and an integrating flywheel disposed for rotational movement with said gear train, said flywheel disposed for double integration of said acceleration force with respect to time, electrical contact means disposed in said gear train for providing an electrical impulse when said seismic mass has moved along said sensitive axis to said switching position.

6. A dual mass double integrating acceleration responsive switch for producing signals which are a function of acceleration incident to forces acting in a direction of a sensitive axis through said switch including a signal indicating when a predetermined value of distance has been reached comprising a bias mass responsive to acceleration forces along said sensitive axis of said switch toward a switching position, spring means having a predetermined restraining force for biasing said bias mass toward a reference position, solenoid means for locking said bias mass into said reference position and movable into an unlocking position in response to a first condition, a seismic mass responsive to acceleration forces along said sensitive axis of said switch and movable toward a switching position, said seismic mass including a gear rack and maintained at said reference position by said bias mass, double integrating means comprising a gear train and a flywheel whereby the axial distance traveled by said seismic mass is directly proportional to said distance, said gear train having a first gear thereof meshing with said gear rack and a second gear thereof having distance switching means mounted thereon, said first gear and said second gear disposed for identical rotational movement, a pair of electrical contacts disposed to receive said distance switching means.

7. The invention defined in claim 6 including means for adjusting the position of said electrical contacts relative to said second gear.

8. The invention defined in claim 7 including electrical means for deactivating said solenoid and locking said seismic mass into position upon completion of the stroke of said seismic mass.

9. The invention defined in claim 6 including: switching means for indicating a predetermined value of acceleration has been reached comprising a pair of normally closed electrical contacts and insulation means disposed on said bias mass for movement between said contacts and breaking an electrical circuit.

References Cited in the file of this patent

UNITED STATES PATENTS

| | | |
|---|---|---|
| 2,850,590 | Marks et al. | Sept. 2, 1958 |
| 3,018,664 | Humble | Jan. 30, 1962 |
| 3,100,400 | Wales | Aug. 13, 1963 |